(12) United States Patent
Banks et al.

(10) Patent No.: US 7,003,692 B1
(45) Date of Patent: Feb. 21, 2006

(54) DYNAMIC CONFIGURATION SYNCHRONIZATION IN SUPPORT OF A "HOT" STANDBY STATEFUL SWITCHOVER

(75) Inventors: Donald Banks, San Jose, CA (US);
Praveen Joshi, Union City, CA (US);
Seok Anthony Koh, Fremont, CA (US);
Ajoy K. Thamattoor, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 604 days.

(21) Appl. No.: 10/156,563

(22) Filed: May 24, 2002

(51) Int. Cl.
*G06F 11/00* (2006.01)
(52) U.S. Cl. ............................................. 714/12; 713/1
(58) Field of Classification Search .................. 714/12, 714/11, 13, 10; 707/202; 713/1, 2; 709/248, 709/400
See application file for complete search history.

(56) References Cited

U.S. PATENT DOCUMENTS

| | | | |
|---|---|---|---|
| 5,950,230 A * | 9/1999 | Islam et al. .................. | 711/156 |
| 6,085,333 A * | 7/2000 | DeKoning et al. ............. | 714/7 |
| 6,687,851 B1 * | 2/2004 | Somers et al. ................. | 714/12 |
| 6,856,591 B1 * | 2/2005 | Ma et al. ...................... | 370/216 |
| 2001/0052067 A1 * | 12/2001 | Klein ............................ | 713/1 |

OTHER PUBLICATIONS

Cisco Systems, Inc., "Overview: Cisco 7500 Series Routers High-Availability Initiative Beat the Downtime", 6 pages, retrieved from the Internet on Mar. 15, 2002: <URL:http://www.cisco.com/warp/public/cc/pd/rt/7500/prodlit/haibd_ov.htm>.

Cisco Systems, Inc., "White Paper, High availability for the Catalyst 6000 Family", 26 pages, retrieved from the Internet on Feb. 20, 2002: <URL:http://www.cisco.com/warp/public/cc/pd/si/casi/ca6000/tech/hafc6_wp.htm>.

Cisco Systems, Inc., "Route Processor Redundancy Plus for the Cisco 12000 Series Internet Router", 22 pages, retrieved from the Internet on Feb. 20, 2002: <URL:http://www.cisco.com/univercd/cc/td/doc/product/software/ios120/120newft/120limit/120st/120st17/rpr_plus.htm>.

Cisco Systems, Inc., "White Paper: Cisco Express Forwarding (CEF)", 7 pages, retrieved from the Internet on Apr. 9, 2002: <URL:http://www.cisco.com/warp/public/cc/pd/iosw/iore/tech/cef_wp.htm>.

* cited by examiner

*Primary Examiner*—Scott Baderman
(74) *Attorney, Agent, or Firm*—Charles E. Krueger

(57) ABSTRACT

A system and method for supporting a "hitless" switchover from an Active to a Standby processor utilizes several points of configuration synchronization. The startup and running configuration files are copied to the Standby processor and subsequent modifications to the Active configuration are synchronized to the Standby configuration.

22 Claims, 3 Drawing Sheets

DYNAMIC CONFIGURATION SYNCHRONIZATION IN SUPPORT OF A "HOT" STANDBY STATEFUL SWITCHOVER

BACKGROUND OF THE INVENTION

As the number of Internet users and Internet-based mission-critical applications increase daily at an unprecedented pace, service-provider and enterprise customers are demanding greater reliability and availability. When every minute of downtime can mean millions of dollars in lost revenue and embarrassing headlines, companies are eagerly looking for solutions to make their systems highly available. Thus, High-Availability (HA) networking products help customers increase uptime and protect financial performance, reputation, and customer loyalty.

Redundancy is one of the key methodologies used to increase system availability. One HA feature is to include both Active and Standby route processors in the router. When the Active Route Processor (RP) fails or is requested to switch over, the Standby Route Processor takes over so that the system continues processing and forwarding. Switchover occurs when system control and routing protocol execution is passed from the Active RP to the Standby RP. A "hitless" switchover implies no loss of sessions and continued forwarding of traffic during the switchover. The system maintains the appearance of a single router with a single management interface to the outside world at all times so that when a failure occurs, migrating control to another processor is not visible.

Existing systems employ such methodology to deal with route processor failure and increase the system availability. However, there are still areas in this process that can be optimized. In the switchover process, the time from initial failure to first packet transmission can be broken down as follows:

1. Time to identify failure
2. Time to load and boot software on Standby RP
3. Time to load new configuration on Standby RP
4. Time to reset and reload line cards
5. Time to load new configuration on line cards
6. Time to learn routes and pass keepalive message
7. Route convergence
8. Time to begin forwarding again
9. Time to reestablish layer 2 services.

This simplest approach is called Cold Standby, which implies that the entire system will lose function for the duration of the restoration. All sessions and all traffic flowing through the router are lost during the recovery time. The benefit of using Cold Standby is that the router restarts without manual intervention by rebooting with the Standby RP taking control of the router.

Various processor redundancy schemes eliminate one or more of the above steps. For example the second and third steps can be eliminated if the Active and Standby RPs both boot and initialize upon powerup. If the line cards are kept up during switchover then the fourth and fifth steps can be eliminated. A "hot" Standby RP is fully initialized and synchronized with the Active RP and is able to implement a hitless switchover. The time taken by steps 6 and 7 can be hidden by reducing step 8 to zero or near zero time. Step 9 can be reduced to a few seconds.

HA features are especially important on edge routers because these routers do not benefit from redundant network architecture topologies that core routers typically benefit from, and, therefore, are likely to be a single point of failure in a network. Customers see the downtime as a major obstacle to their business goals and customer relations. However, it is not always possible to build equipment and circuit redundancy throughout the entire network. Therefore the availability initiatives of an edge router must concentrate on features that will:

Isolate any errors on one part of the router from affecting the rest of the system.
Allow a faulty processor to switch over to any redundant processors in the event of a failure.
Minimize the switchover time between processors.

In order to ensure that a "hot" Standby processor is able to take up where the Active left off when a switchover occurs, it is required that both the Active and the Standby Control Processors are configured exactly the same at all times. This is necessary so that applications and system services that depend on configured resources have the same resources available on the Standby as they had on the Active before the switchover.

IOS® is Cisco's Internet Operating System software which delivers intelligent networking services on Cisco routers. Stateful IOS services and protocols running on the Active checkpoint state data to the Standby ensuring that it is always current and capable of taking over where the Active left off when a switchover takes place. In some architectures, a Forwarding Processor (FP) is packaged with the RP so that they fail as a unit. In such architectures, the FP packaged with the Standby RP must be kept synchronized with the FP packaged with the Active RP.

In systems that provide this functionality, it is expected that the individual HA-aware applications and system services create and maintain the necessary resources and checkpoint any state associated with the necessary resources to the Standby as the state changes on the Active. In existing systems, this only works when all elements of the system are properly instrumented and are HA-aware. For IOS®, in order to allow applications to migrate to HA-aware implementations as demand requires, most applications and services are not HA-aware and therefore are not modified to create required resources on the Standby as well as the Active.

Therefore, it is not possible to maintain synchronized configuration between the Active and Standby RPs when both HA-aware and non-HA aware applications, that are not properly instrumented to create, maintain, and checkpoint the necessary resources, are running on the same router. In that case the router will not be able to take advantage of the HA features.

BRIEF SUMMARY OF THE INVENTION

In one embodiment of the invention, the configuration files of the Active processor are synched to the configuration files of the Standby RP at several points.

In another embodiment of the invention, the Active startup configuration file and running configuration file are copied to the Standby processor.

In the another embodiment of the invention, configuration changing commands entered by a user are executed first on the Active processor and, if the command succeeds, are executed on the Standby processor.

In another embodiment of the invention, if a configuration command executed on the Standby processor fails, then a lack of synchronization is indicated.

In another embodiment of the invention, if the Active configuration file is closed or written to then it is copied to the Standby configuration file.

In another embodiment of the invention, both the Active and Standby processors transition through states during startup. The Standby processor remains in a "cold" state until the Active processor becomes active. Then, the Active processor updates the configuration files of the Standby processor to transition it into a "Hot" state where it is ready to become active in the event of a switchover.

Other features and advantages of the invention will be apparent in view of the following detailed description and appended drawings.

DETAILED DESCRIPTION OF THE INVENTION

The invention will now be described with reference to various embodiments. The first embodiment to be described, by way of example not limitation, is implemented on a router architecture designed by the assignee of the present invention.

Generally a router includes a chassis, which contains basic components such as power supply, fans, slots, ports and modules that slide into the slots. The modules inserted into the slots are line cards which are the actual printed circuit boards that handle packet ingress and egress. Line cards provide one or more interfaces over which traffic flows. Thus, depending on the number of slots and interfaces, a router can be configured to work with a variety of networking protocols.

Figure 1:
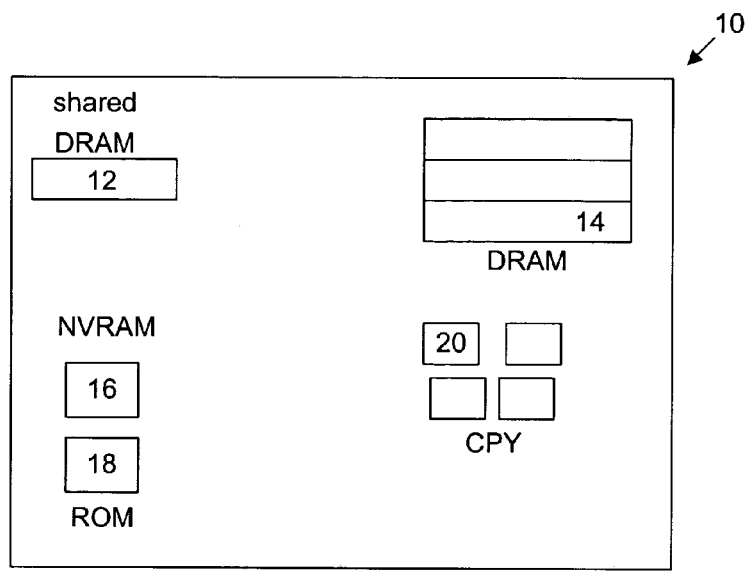
FIG. 1 is a block diagram of a motherboard of a router.

The router is a computer and includes a motherboard having components depicted in the block diagram of FIG. 1.

In FIG. 1, the motherboard 10 includes shared DRAM 12, DRAM 14, NVRAM 16, ROM 18 and a CPU 20. (Other components on the motherboard not relevant to the present description are not depicted). The DRAM 14 is the working storage utilized by the CPU and the shared DRAM 12 is dedicated to handling the router's packet buffer. The NVRAM (non-volatile RAM) is used to store the router's configuration file and also includes flash memory for storing an image of the IOS® (Internetworking Operating System). The ROM 18 holds a boot-start program which holds a minimum configuration state needed to start the router.

The two main files stored by the router are the configuration file and IOS® software. The IOS® is the operating system and cannot be modified by a user. Like other operating systems it manages the internal operations of the router. The configuration file contains information specific to the operation of the particular router including information describing the network environment in which the router will run and how the network manager wants the router to behave in that environment. The IOS® utilizes the information in the configuration file to cause the router to operate in the specified network environment in the manner intended.

The router also stores dynamic files which are created by the router during operation and stored in RAM. Such files include dynamic configuration data which is configuration data that changes in real time such as ATM switched virtual circuits (SVCs). These dynamic files are created by the router in real-time to adapt to changing conditions and are not directly controllable by the user. However, the dynamic files can be controlled indirectly by setting parameters in the configuration file.

In the router of the present embodiment the configuration file can not be directly modified by the user. Configuration files are modified by entering IOS® commands and then viewing the new configuration files to determine whether the desired results have been achieved.

IOS® provides several control interfaces, which use physical connectors on the console, to allow a user to interact with the router. These communication interfaces include a console port, an auxiliary port, and a network connection. When using Telnet to access a router, a virtual line (VTY) is provided by IOS®. Up to five virtual terminal lines (numbered VTY 0–4) are supported so that it is possible to have five virtual terminal sessions running on a router at the same time. Additionally, some routers include a version of IOS® that provides an HTTP user interface or that can be configured using SNMP.

There are two types of configuration files in every router: 1) the startup-config file; and 2) the running-config file. The startup-config file is stored in NVRAM where the IOS® bootstrap program can fetch the router's configuration parameters when starting up. The image of the running-config, a snapshot version of the current configuration, is stored in RAM and can be dynamically changed by the user while the router is in operation.

If it is desired to save modifications in the running-config for use after the router is turned off, a write or copy command is used to store the modified running-config file to NVRAM. Then, when the router is rebooted the startup-config file will include the modifications that have been made to the running-config file.

Figures 2A, 2B:
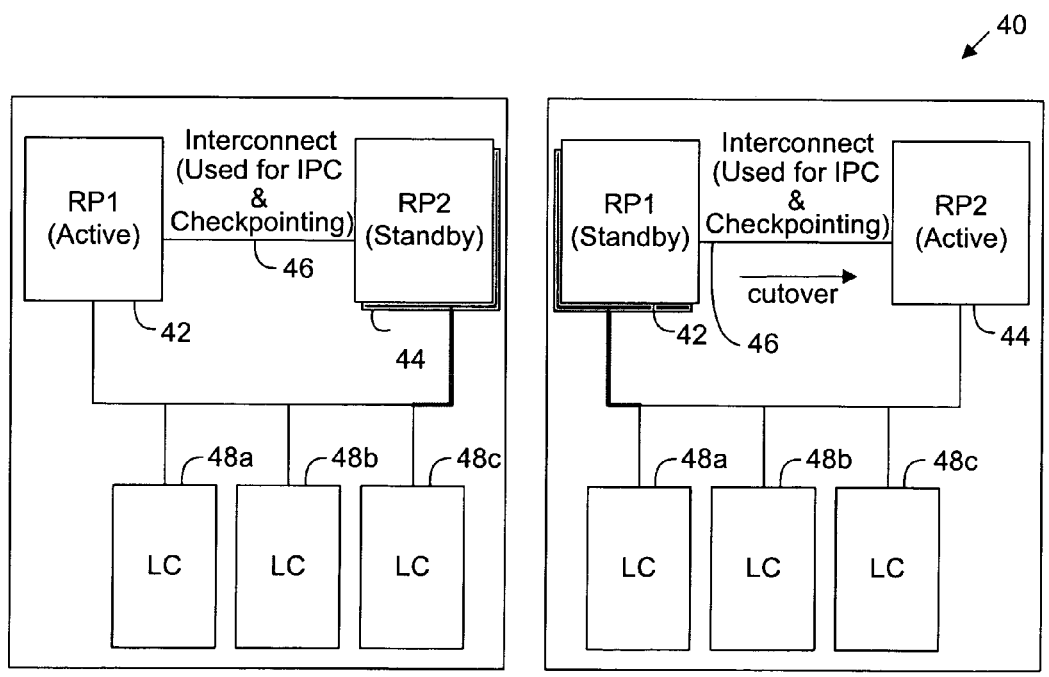
FIGS. 2A and B are block diagrams depicting a redundant system utilized in a preferred embodiment of the invention.

An embodiment of a system for maintaining configuration synchronization between the Active and Standby RPs will now be described. FIGS. 2A and 2B are block diagrams of the system.

Stateful IOS® services and protocols running on the Active RP checkpoint state data to the Standby ensuring that it is always current and capable of taking over where the Active left off when a switchover takes place. In some architectures, a Forwarding Processor (FP) is packaged with the RP so that they fail as a unit. In such architectures, the FP packaged with the Standby RP must be kept synchronized with the FP packaged with the Active RP.

In FIGS. 2A and B, an HA system 40 consists of redundant Active RP1 42 and Standby RP2 44 interconnected via some media 46 with sufficient bandwidth that it can be used for IPC and checkpointing messages between the Active and Standby RP. This may or may not be a dedicated media. This interconnect 46 can be a dedicated Ethernet interface, some fabric interconnect or an internal bus, but it should be sized to support peak bandwidth requirements experienced during initialization or periods of high connection rate when a great deal of state information is being synchronized. Ideally this interconnect 46 should provide at least two paths since it is a critical single point of failure in the system. This communication path is best implemented as an out-of-band data path so that it is available at all times and so that it does not impact the routed traffic being serviced by the router.

Each RP is also connected to the Line Cards 48a, b, and c through some system bus or other interconnect 50. The Line Cards 48 must be sharable (i.e., accessible to each RP 42 or 44) over this interconnect 50 although their access may be serially restricted; only the Active RP 42 may own and operate the Line Cards providing service at any point in time. When a service affecting fault occurs on the Active RP 42 (or a manual switchover is requested) the Standby RP 44 begins the process of assuming control of the Line Cards 48 and transitioning the Standby applications to Active so that the Standby can begin providing service as the new Active. FIGS. 2A and B demonstrate a system with the specified attributes before (FIG. 2A) and after (FIG. 2B) a switchover. Here RP2 44 becomes the new Active after the switchover and assumes control of the Line Cards.

In the present embodiment, in order to ensure that the configuration is kept synchronized between the Active and Standby RPs, there are multiple points at which synchronization takes place. This synchronization is initiated by the Active RP and the transfer of data takes place over the interconnect described above. There are four main synchronization points in the currently-described embodiment.

These points are:
1. Copying the start-up config from the Active RP to the Standby RP during initialization.
2. Copying the running-config from the Active RP to the Standby RP so that the Standby is configured the same as the Active.
3. Line-by-line Synchronizing subsequent CLI configuration commands.
4. Synchronizing whenever the Active start-up config file in NVRAM is closed or written.

As described above, one of the key components of any highly available system which implements stateful switchover is the sharing of peer client, entity-specific, state data between peer instantiations of a client running on an Active and Standby instance of IOS®. The client entity-specific state data must be initially synchronized (i.e., between the Active or Standby RP at initialization) and at any time state data, critical to a successful Active to Standby client switchover, occurs. The initial synchronization is also called "bulk sync" and the later synchronization is called "dynamic sync". As described more fully below, dynamic sync for configuration is implemented by a process called "line-by-line sync".

In the currently described embodiment a Redundancy Facility (RF) can assist with the "when to" synchronize while the system is progressing to a steady state condition. During steady state operation, the applications themselves must decide when to synchronize. The Checkpointing Facility (CF) assists with the "how to" synchronize. The RF and CF will now be briefly described with reference to FIG. 3.

Figure 3:
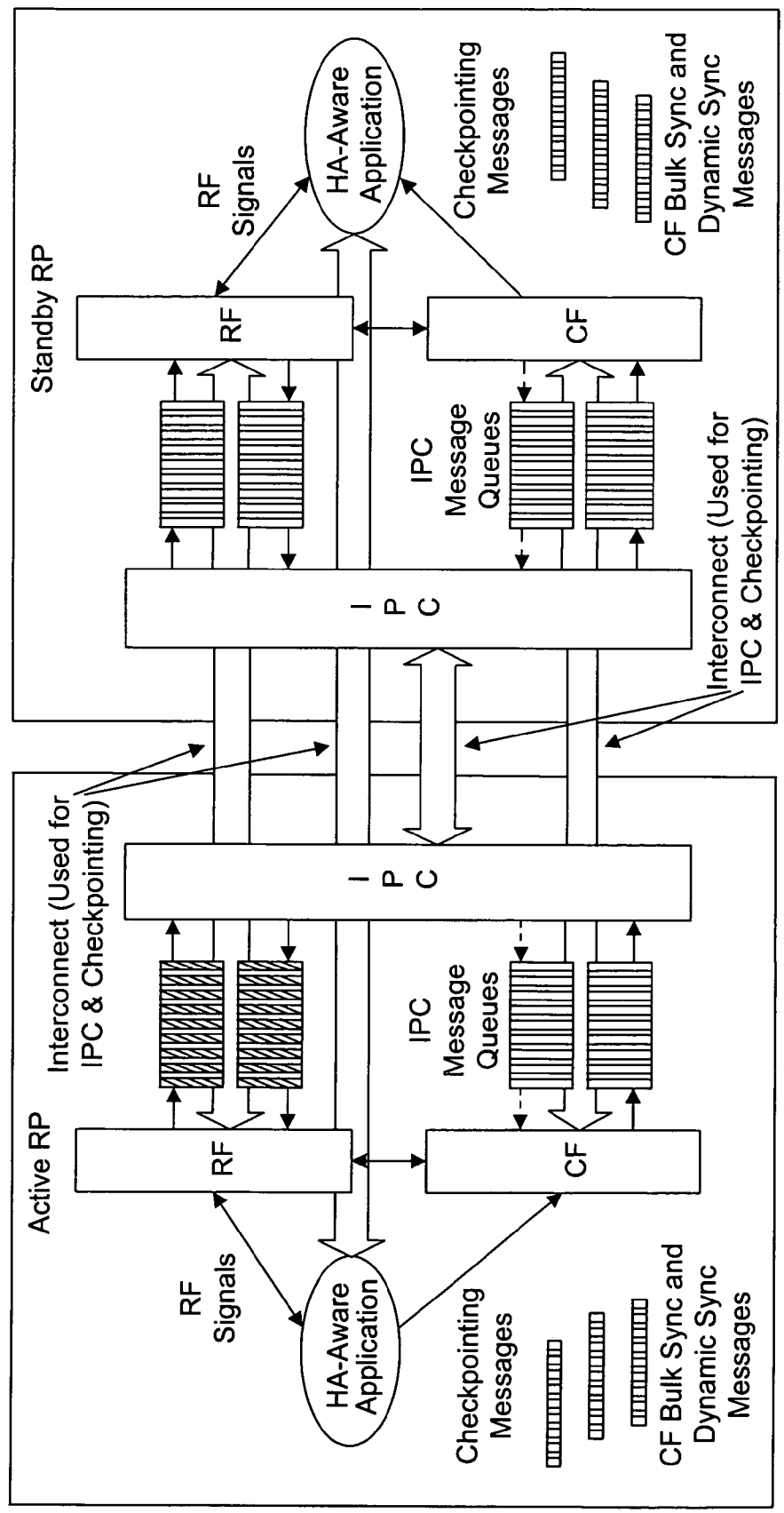
FIG. 3 is a block diagram depicting the redundancy and checkpointing facilities used in one embodiment.

As depicted in FIG. 3, each RP has a Checkpointing Facility and a Redundancy Facility Implementation. Messages are passed between the Active and Standby RPs via the interconnect utilizing IPC (interprocess communication) facilities.

In a preferred embodiment a redundancy facility (RF) is utilized to determine when to initiate the configuration file sync. After initialization, the Standby RF progresses through various states until it reaches the Standby-Hot state.

The Redundancy Facility (RF) is a portable framework that provides synchronization and switchover coordination between redundant processors running IOS®. The RF infrastructure provides a series of client services as well as functions for control and monitoring of system redundancy. RF provides notification of transition events which occur on both processors to its clients.

RF clients may maintain state synchronization between their Active and Standby instances. If they choose to maintain state, clients will use the Checkpointing Facility (CF) to do so. The format of client messages and the details of the synchronization protocol are client-specific. Initial synchronization is expected to be done as a result of an RF notification. Dynamic state changes, once the systems have reached the stable state (i.e., Active-Fast and Standby-Hot for the Active and Standby RPs respectively), will be synchronized at times decided by the client application.

A client may register with RF for notification of system state progression and changes in redundancy control configuration. These notifications are provided by RF in the form of synchronous and asynchronous callbacks. Clients are expected to use events to control the state of the applications as appropriate to their role at the time of the event.

The CF facilitates the saving (i.e., synchronization) of client-specific state data which will be transferred to a peer client on a remote RP. Once a valid Active to Standby peer client checkpointing session is established, the checkpointed state data will be guaranteed to be delivered to the remote peer client at most once, in order, and without corruption. (Note that order is defined as within the state of one peer client to peer client relationship and does not imply any relationship to any other single checkpointing peer client. The order amongst non-peer clients is the order of arrival at the IPC queue).

As described above, bulk sync is the procedure where the Active RP client transfers all the relevant state data it has to the Standby RP peer client. Bulk Sync is usually associated with the initial transfer of state data which occurs when the Standby first comes up.

Line-by-line sync is a procedure where the CLI in an Active RP transfers state data to the Standby RP during normal (i.e., post-initial bulk synchronization) operation. The configuration information is synchronized from the Active RP to the Standby RP. Line-by-line synchronization is similar to Dynamic Sync but refers specifically to configuration synchronization.

The four points of configuration file synchronization will now be described in greater detail.

Turning to the first point of synchronization, bulk sync on the Active RP, the startup-config file (stored in NVRAM as a series of text commands) is copied from the NVRAM 16 of the Active RP to the NVRAM 16 of the Standby RP. This ensures that if the Standby is rebooted as the Active, it will use the last configuration saved by the Active at the time.

Later the Active sends the running-configuration to the Standby which the Standby parses and uses for initialization. The Standby then generates the running-configuration in a buffer on the Standby and compares it with the running-configuration copied from the Active which is also saved in the DRAM area. The Standby sends the results of this comparison (same or different) and the success of the configuration (configured or not) to the Active RP. If this information indicates that after the configuration is parsed on the Standby, the results are different, then the Standby is out of sync and a registered policy application, such as the Fault Manager, must decide the action to take. The default action is to reset and reboot the Standby. The number of times this can happen is limited (and configurable) so that a hard fault results in the Standby being taken out of service until the problem can be fixed. This ensures that the Active and Standby are in sync on any subsequent reboots with the current Standby RP (RP2) as the Active RP.

The Active RP initializes access points to the file system of the Standby RP as the Standby RP is initialized. This allows the Active RP to view the NVRAM directory located on the Standby as if it were locally available; the Active RP can directly copy its startup configuration into NVRAM on the Standby RP.

Turning now to the second point of synchronization, the running configuration file stored in RAM 14 the Active RP (which is the startup-config with any changes made on the Active via CLI) is copied to the RAM 14 of the Standby RP and is parsed there. Early during Standby initialization, a special file system, RCSF, is created for the running-config file synchronization on the Standby.

The RCSF is the designated placeholder to receive the running configuration from Active. The RCSF file system resides in the Standby DRAM area. The running configuration is generated dynamically by traversing the entire parse tree and calling the command function to output the data associated with that command. This ensures that the Standby is running the same configuration as the Active at this point. In order to avoid race conditions with RF clients, Bulk Config Sync is completed early; that is, before any other Bulk Sync RF clients begin to run on the Standby. During Bulk Config Sync, any subsequent configuration request on the Active is delayed or rejected until bulk config sync is completed.

Figure 4:
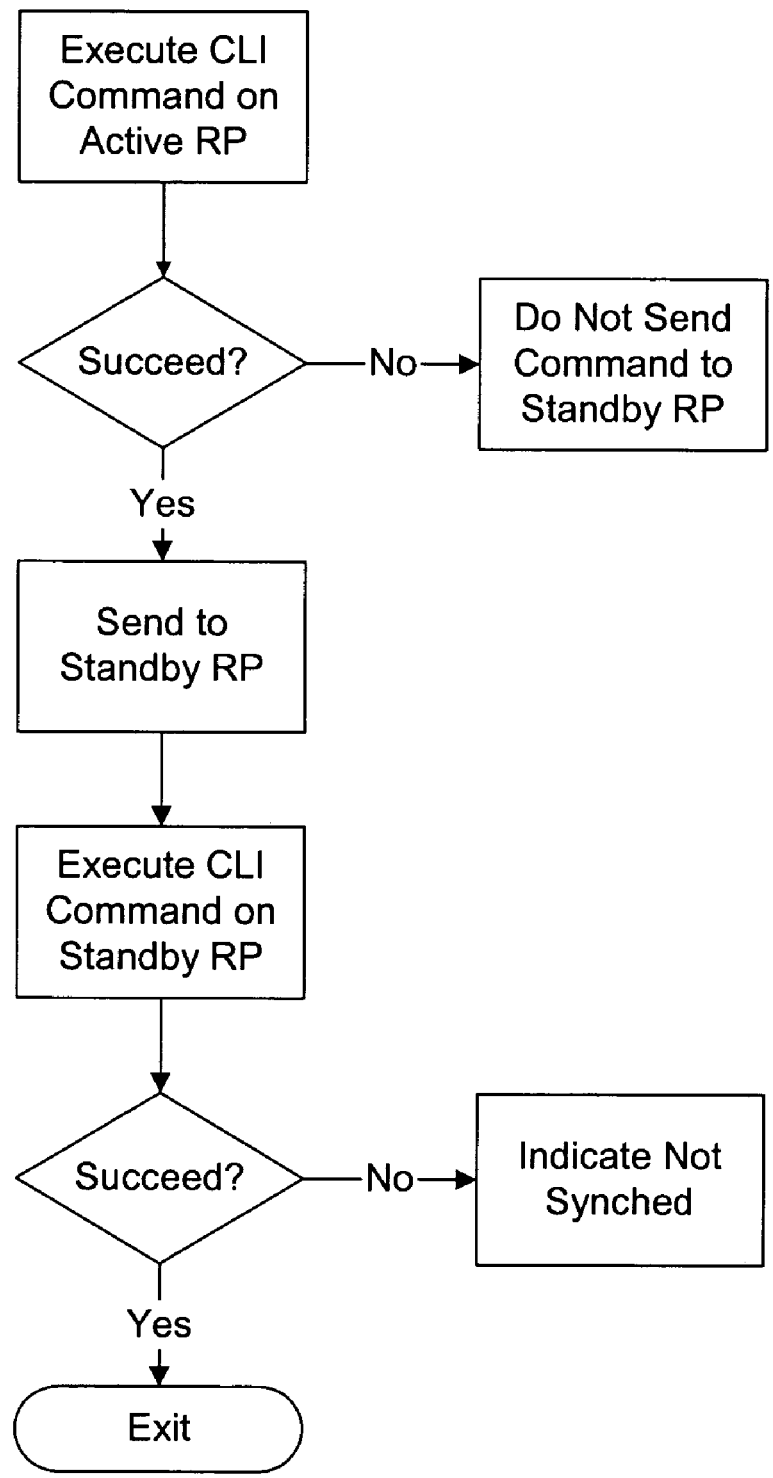
FIG. 4 is a flow chart of the process of synchronizing configuration changing commands.

Turning next to the third point of synchronization, when the Standby RP is in the Standby-Hot state, subsequent CLI configuration commands are then synchronized to the Standby using line-by-line config sync. This process is depicted in the flow chart of FIG. 4 and is serialized to ensure predictable results by first executing the command on the Active. If the command succeeds on the Active RP then it is sent to the Standby RP to be executed there. If the command fails then it is not sent to the Standby RP.

If the command succeeds on the Standby RP, then the Standby RP remains a viable switchover target for the Active RP. If the command fails on the Standby RP, then the Standby is out of sync and, by default, must be reset because it no longer represents a stateful replica of the Active RP. However, the Fault Manager may have been instructed to take other programmatic action when such a failure occurs.

There are three methods used to determine success or failure of a command, "Parser Return Codes", "Best Effort Method", and "Blind Sync". The Parser Return Codes (PRC) approach is initially implemented for selected subgroups of CLI commands, for example all of the commands identified as being used in Service Provider networks. Eventually all CLI commands will implement PRC. Commands that do not implement PRC are automatically recognized by the parser and one of the other two methods are used to determine success or failure on the Active and Standby—i.e., whether to sync or not and whether the Standby remains in sync after the command has been executed there.

With the PRC approach, each command returns a return code indicating success or failure. "Success" is defined as complete success; partial success is considered a failure and the command is responsible for "undoing" any partial changes that have taken place. If there is more than one way of declaring success for a particular command (i.e., more than one result is considered successful), the command indicates which result it has implemented so that the result on the Standby can be compared. Only commands which are successful on the Active are sync'd to the Standby for execution there. Again, PRC is used to determine success or failure on the Standby. The result is passed back to the Active for comparison. The result is passed to any registered policy application. If failure is indicated on the Standby, then the default action is to reset and reboot the Standby since it is out of sync. If a policy application such as the Fault Manager is registered, the action taken is determined programmatically by it.

The second method is referred to as the "Best Effort Method" (BEM). This approach is used when the parser recognizes PRC is not implemented for a command. If this command requires exceptional processing, because it has not implemented PRC and BEM will not properly detect success or failure, the "Blind Sync" procedure is used. With the BEM method, the configurations before and after command execution are compared to determine if there were in fact any changes to the configuration effected by the command. This is done by running an NVGEN, which dynamically generates the current configuration, before and after and saving the results for comparison. If the results indicate there are changes, then the command is sent to the Standby for execution. After execution is complete on the Standby, NVGEN is run there and the configuration results are sent to the Active where they are compared to the Active post-NVGEN results. If they are the same, then the command succeeded on the Standby and the two RPs are in sync. The result is passed to any registered policy application. If failure is indicated on the Standby, then the default action is to reset and reboot the Standby since it is out of sync. If a policy application such as the Fault Manager is registered, the action taken is determined programmatically by it.

The "Blind Sync" method is implemented for those commands that are exceptions to the above two methods. This encompasses a relatively small set of commands, such as commands that update microcode for example, but do not affect the configuration in any discernable way. In this case there is no confirmation that the CLI succeeded on either the Active or Standby RPs. In order to deal with this, a compare utility is run periodically to confirm that the configuration on the Active and Standby RPs are synchronized. The frequency of running the compare utility is determined based on a trade-off between the cost of running the utility and risk of loss of synchronization. The frequency is customer tunable.

Turning finally to the fourth point of synchronization, to ensure that the startup-config at the Standby RP always accurately represents the Active RP startup-config, the Standby file is also synchronized when the Active configuration file is closed after it has been opened for a write operation (i.e., a "wr mem" exec command). To provide consistent configuration guarantees, multiple input sources for configuration commands are managed and their execution is serialized appropriately in an HA environment. Multiple VTY sessions (or SNMP commands or HTTP sessions) can get into configuration mode simultaneously by maintaining the appropriate locking mechanisms to serialize the operations and providing the appropriate history table to manage the history properly for each session.

On the Active, a parser mode history table is maintained per VTY session, and a session based entry is added to an ordered singly linked list when the first CLI is received on that session. The entry is deleted when the session is closed or exits config-mode.

On the Standby side, a linked list of entries is maintained based on the Active tty session number. Whenever the Standby receives a sync request from the Active, it walks through the queue looking for a matching Standby parser mode entry with the same tty number. If it is not found, then a new entry is created. The command is then executed using the generic parser information attached to Standby parser mode entry. This entry is deleted from the list whenever Active syncs the "end", "Ctrl-Z" and "Ctrl-C" commands over to Standby.

Multiple configuration sessions are made possible by maintaining a linked list of command execution structures in the Standby context. These structures match the Active's configuration session number.

HTTP creates a VTY session only while a command is being executed and deletes the session immediately after the command execution is completed. For an HTTP configuration request from an external host, the raw URI information is sent to the Standby where it is processed as if it had been received directly via its own HTTP session.

The invention may be implemented as program code, stored on a computer readable medium, that is executed by a digital computer. The computer readable medium may include, among other things, magnetic media, optical media, electromagnetic fields encoding digital information, and so on.

Thus, a system has been described that enables a successful switchover for both HA-aware and HA-unaware applications and features. This approach enables a "hot" Standby approach to HA and provides a basis for a "hitless" switchover. It also provides for a migration to HA-aware implementations as business needs demand. It provides for transparent configuration updates on the Standby without the need for any user interaction.

The invention has now been described with reference to various embodiments. Alternatives and substitutions will now be apparent to persons of ordinary skill in the art. For example, although the embodiments have been described with reference to IOS® the principles are generally applicable to systems having processor redundancy utilizing applications that have not been upgraded to implement high availability performance. The details of state transformations in the redundancy facility are described by way of example and the invention is not limited to any particular state machine or state transition protocol. Accordingly it is not intended to limit the invention except as provided by the appended claims.

What is claimed is:

1. A method for maintaining processor synchronization in a system having an Active processor that controls all system resources that are providing service and a Standby processor for assuming control if the Active processor fails or a manual request is made to switchover, with each processor including memory for storing a startup-config file, the method comprising:
    bulk synchronizing the Standby and Active processors at a first point of synchronization by:
    copying a startup configuration file from the Active processor to the Standby processor;
    creating a file system on the Standby processor memory for running configuration synchronization;
    sending a running configuration file from the Active processor to the Standby processor and generating the running configuration at the Standby processor which is stored in the file system; and
    dynamically synchronizing the Standby and Active processors subsequent to the first point of synchronization by:
    synchronizing subsequent configuration changes on the Active processor to the Standby processor thereby maintaining configuration synchronization between the processors.

2. The method of claim 1 where synchronizing configuration changes further comprise:
    executing a subsequent configuration command on the Standby processor only if the subsequent configuration command succeeds when executed on the Active processor.

3. The method of claim 2 further comprising:
    subsequent to executing a configuration command on the Standby processor, indicating to the Active processor whether the command succeeded on the Standby processor.

4. The method of claim 1 with dynamically synchronizing further comprising:
    synchronizing startup-config files on the Active and Standby processors when an Active configuration file has been closed after it has been opened for a write operation.

5. A system for maintaining processor synchronization in a system having an Active processor that controls all system resources and a Standby processor for assuming control if the Active processor fails or a manual request is made to switchover, with each processor including memory for storing a startup-config file, the system comprising:
    means for bulk synchronizing the Standby and Active processors at a first point of synchronization including:
    means for copying a startup configuration file from the Active processor to the Standby processor during startup;
    means for creating a file system on the Standby processor memory for running configuration synchronization during startup;
    means for sending a running configuration file from the Active processor to the Standby processor and generating the running configuration at the Standby processor which is stored in the file system;
    means for dynamically synchronizing the Standby and Active processors subsequent to the first point of synchronization including:
    means for synchronizing subsequent configuration changes on the Active processor to the Standby processor thereby maintaining configuration synchronization between the processors subsequent to startup.

6. The system of claim 5 where the means for synchronizing subsequent configuration changes further comprises:
    means for executing a subsequent configuration command on the Standby processor only if the subsequent configuration command succeeds when executed on the Active processor.

7. The system of claim 6 further comprising:
    means for indicating to the Active processor that a subsequent configuration command executed on the Standby processor succeeded.

8. The system of claim 5 with the means for dynamically synchronizing further comprising:
    means for synchronizing startup-config files on the Active and Standby processors when an Active configuration file has been closed after it has been opened for a write operation.

9. In a high-availability router that includes redundant route processors (RPs) where a first RP is an Active RP that controls routing and processing and a second RP is a Standby RP which takes over routing and processing during a switchover, with both RPs having non-volatile RAM (NVRAM) and dynamic RAM (DRAM), and with an interconnect coupling the Active and Standby RPs to facilitate interprocess communication, a method for automatically synchronizing the configuration of the Active RP to the Standby RP so that the Standby RP will be configured the same as the Active RP in the event of a switchover, said method, initiated and controlled by the Active RP, comprising:
    bulk synchronizing the Standby and Active processors at a first point of synchronization by:

copying a startup-configuration file, comprising a series of text commands, from the NVRAM of the Active RP to the NVRAM of the Standby RP to ensure that any subsequent reboot of the Standby RP as the Active RP will accurately reflect any committed configuration changes;

creating a running-config file system in the DRAM of the Standby RP as a dedicated placeholder for receiving running configuration commands from the Active RP;

copying a running-configuration file, comprising a series of text commands, from the Active RP to the running-config file system of the Standby RP;

executing the text commands in the running-configuration file at the Standby RP to synchronize running configurations between both RPs;

verifying a bulk config sync by comparing the running-configuration files of the Active and Standby RPs and conveying the result back to the Active RP for appropriate action;

dynamically synchronizing the Standby and Active processors subsequent to the first point of synchronization by:

for each configuration text command subsequently called on the Active RP:

executing the command on the Active RP;

if the command succeeds, sending the command to the Standby RP;

if the command is sent to the Standby RP, executing the commands, determining whether it succeeds on the Standby RP, and conveying the result to Active RP;

if the command fails on the Standby RP, indicating that the Standby RP is not synchronized and resetting the Standby RP.

10. The method of claim 9 where the step of executing the command and determining whether it succeeds on the Standby RP further comprises:

returning a return code indicating success or failure on the Active RP.

11. The method of claim 9 where the step of executing the command and determining whether it succeeds on the Standby RP further comprises:

comparing configuration results on the Standby RP with configuration results on the Active RP and, if the results are the same, indicating success on the Active RP.

12. The method of claim 9 where the step of executing the command and determining whether it succeeds on the Standby RP further comprises:

running a compare utility at selected time intervals to confirm that the configuration files on the Active and Standby RPs are synchronized.

13. The method of claim 9 with dynamically synchronizing further comprising:

synchronizing startup-config files on the Active and Standby processors when an Active configuration file has been closed after it has been opened for a write operation.

14. In a high-availability router that includes redundant route processors (RPs) where a first RP is an Active RP that controls routing and processing and a second RP is a Standby RP which takes over routing and processing during a switchover, with both RPs having non-volatile RAM (NVRAM) and dynamic RAM (DRAM), and with an interconnect coupling the Active and Standby RPs to facilitate interprocess communication, a system for automatically synchronizing the configuration of the Active RP to the Standby RP so that the Standby RP will be configured the same as the Active RP in the event of a switchover, said system comprising:

means for bulk synchronizing the Standby and Active processors at a first point of synchronization including:

means for copying a startup-configuration file, comprising a series of text commands, from the NVRAM of the Active RP to the NVRAM of the Standby RP to ensure that any subsequent reboot of the Standby RP as the Active RP will accurately reflect any committed configuration changes;

means for creating a running-config file system in the DRAM of the Standby RP as a dedicated placeholder for receiving running configuration commands from the Active RP;

means for copying a running-configuration file, comprising a series of text commands, from the Active RP to the running-config file system of the Standby RP;

means for verifying bulk config sync by comparing the running-configuration files of the Active and Standby RPs and conveying the result back to Active RP for appropriate action;

means for dynamically synchronizing the Standby and Active processors subsequent to the first point of synchronization including:

means for executing the text commands in the running-configuration file at the Standby RP to synchronize running configurations between both RPs;

means for executing each subsequent configuration text command on the Active RP;

where:

if the command succeeds, the command is sent to the Standby RP;

if the command is sent to the Standby RP, the command is executed, a determination is made whether it succeeds on the Standby RP, and a result of the determination is conveyed to the Active RP;

if the command fails on the Standby RP, it is indicated that the Standby RP is not synchronized and the Standby RP is reset.

15. The system of claim 14 where the means for executing the command and determining whether it succeeds on the Standby RP further comprises:

means for returning a return code indicating success or failure on the Active RP.

16. The system of claim 14 where the means for executing the command and determining whether it succeeds on the Standby RP further comprises:

means for comparing configuration results on the Standby RP with configuration results on the Active RP and, if the results are the same, indicating success on the Active RP.

17. The system of claim 14 further comprising:

means for synchronizing startup-config files on the Active and Standby processors when an Active configuration file has been closed after it has been opened for a write operation.

18. The system of claim 14 with the means for dynamically synchronizing further comprising:

means for synchronizing startup-config files on the Active and Standby processors when an Active configuration file has been closed after it has been opened for a write operation.

19. A computer program product for maintaining processor synchronization in a system having an Active processor that controls all system resources that are providing service and a Standby processor for assuming control if the Active processor fails or a manual request is made to switchover, with each processor including memory for storing a startup-config file, the computer program product comprising:

a computer usable medium having computer readable program code physically embodied therein, said computer program product further comprising:

computer readable program code for bulk synchronizing the Standby and Active processors at a first point of synchronization including:

computer readable program code for causing a startup configuration file to be copied from the Active processor to the Standby processor;

computer readable program code for causing a file system to be created on the Standby processor memory for running configuration synchronization;

computer readable program code for a running configuration file to be sent from the Active processor to the Standby processor and generating the running configuration which is stored in the file system; and computer readable program code for dynamically synchronizing the Standby and Active processors subsequent to the first point of synchronization including:

computer readable program code for causing subsequent configuration commands executed on the Active processor to be synchronized to the Standby processor thereby maintaining configuration synchronization between the processors.

20. The computer program product of claim 19 where the computer readable program code for causing said processor to synchronize configuration commands further comprises:

computer readable program code for causing a subsequent configuration command to be executed on the Standby processor only if the subsequent configuration command succeeds on the Active processor.

21. The computer program product of claim 20 further comprising:

computer readable program code for, subsequent to executing a configuration command on the Standby processor, the Standby processor to indicate to the Active processor whether the command succeeded on the Standby processor.

22. A system for maintaining processor synchronization in a system having an Active processor that controls all system resources that are providing service and a Standby processor for assuming control if the Active processor fails or a manual request is made to switchover, with each processor including memory for storing a startup-config file, the system comprising:

an initialization facility that copies a startup configuration file from the Active processor to the Standby processor, creates a file system on the Standby processor memory for running configuration synchronization, and sends a running configuration file from the Active processor to the Standby processor and generates the running configuration which is stored in the file system to bulk synchronize the Active and Standby processors at a first point of synchronization;

a verification facility that compares the running configurations between the Active processor and Standby Processor to generate a comparison result and sends the comparison result to the Active processor for appropriate action; and a synchronizing facility that synchronizes subsequent configuration commands executed on the Active processor to the Standby processor thereby maintaining configuration synchronization between the processors to dynamically synchronize the Active and Standby processors subsequent to the first point of synchronization.

* * * * *